United States Patent [19]

Gardner

[11] 3,910,048
[45] Oct. 7, 1975

[54] HYDRAULIC LOCK FOR HYDRAULIC RATIO CHANGER
[75] Inventor: Delbert J. Gardner, South Bend, Ind.
[73] Assignee: The Bendix Corporation, South Bend, Ind.
[22] Filed: June 20, 1974
[21] Appl. No.: 481,434

[52] U.S. Cl. ............................ 60/568; 188/151 R
[51] Int. Cl.² .................... F15B 7/00; F15B 7/08
[58] Field of Search ............ 60/581, 549, 553, 55 A, 60/568, 562, 565; 188/345, 151; 91/391 R

[56] References Cited
UNITED STATES PATENTS

| | | | |
|---|---|---|---|
| 2,968,926 | 1/1961 | Randol | 60/553 |
| 3,059,433 | 10/1962 | Hirsch | 60/565 |
| 3,059,433 | 10/1962 | Hirsch | 60/576 X |
| 3,062,011 | 11/1962 | Brooks | 60/576 X |
| 3,410,089 | 11/1968 | Snitgen | 60/565 |
| 3,555,822 | 1/1971 | Rivetti | 60/562 |
| 3,698,190 | 10/1972 | Miyai | 60/562 |
| 3,800,539 | 4/1974 | Le Marchand | 60/562 |

FOREIGN PATENTS OR APPLICATIONS

| | | | |
|---|---|---|---|
| 120,260 | 8/1945 | Australia | 60/568 |
| 571,042 | 2/1933 | Germany | 60/568 |

Primary Examiner—Martin P. Schwadron
Assistant Examiner—H. Burks, Sr.
Attorney, Agent, or Firm—Leo H. McCormick, Jr.; William N. Antonis

[57] ABSTRACT

A servomotor for use in a power braking system having a pressure ratio changer wherein a first piston and a second concentric piston supply a master cylinder with an operative force. The first piston is connected to a wall within the servomotor which is moved by a pressure differential. The second piston is concentrically positioned within the first piston to transmit an input force which operates a control valve that develops the pressure differential, and also operates a hydraulic lock valve located within a master cylinder. As the first piston and the second piston move together in response to movement of the wall, hydraulic fluid will flow into a locking chamber past the lock valve. When the maximum force output capable of being generated by the pressure differential is reached, the simultaneous movement of the first and second pistons will cease. Further manual force input from the operator will move the second piston within the first piston to close the lock valve and hold the hydraulic fluid within the locking chamber to prevent the first piston from moving.

10 Claims, 3 Drawing Figures

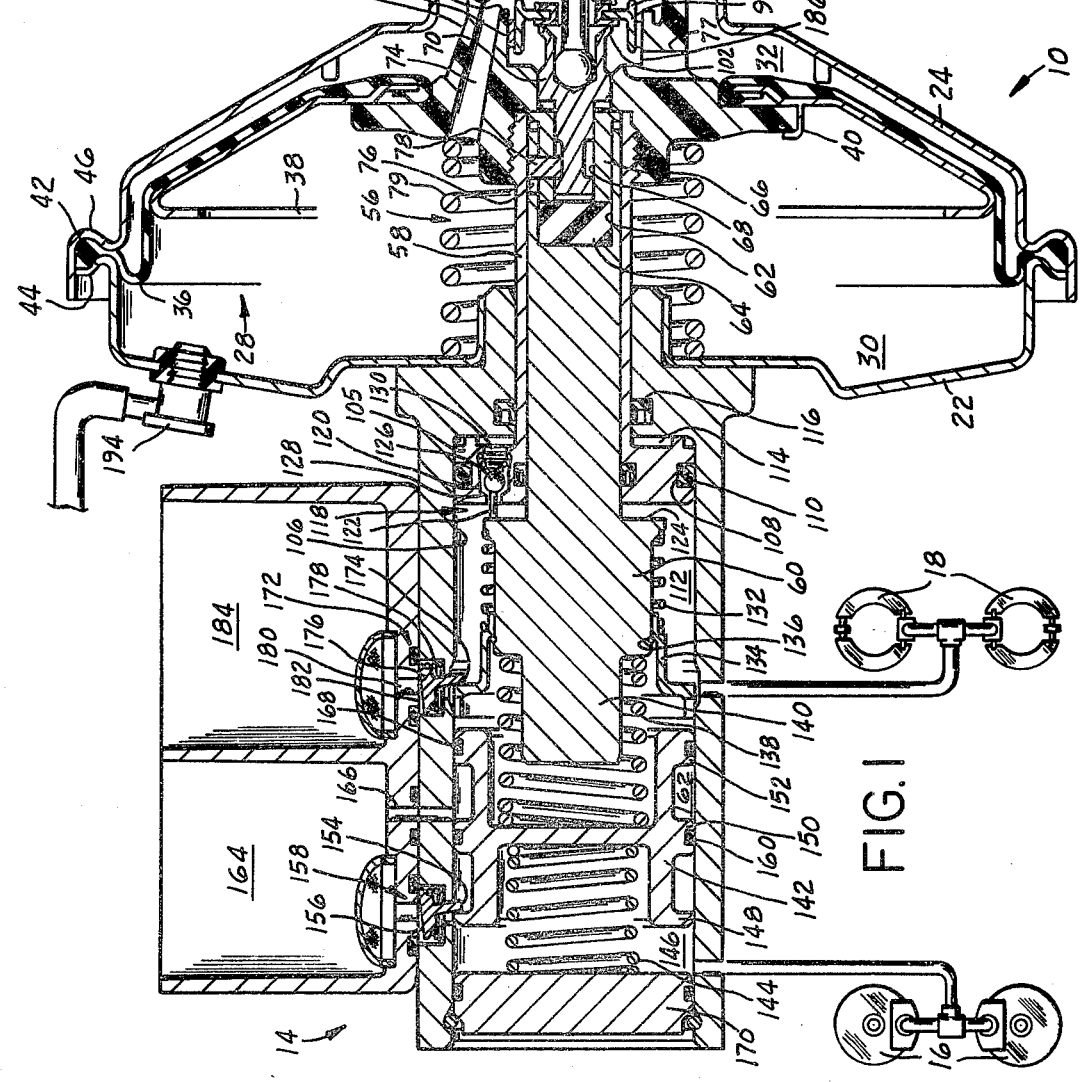

HYDRAULIC LOCK FOR HYDRAULIC RATIO CHANGER

BACKGROUND OF THE INVENTION

In U.S. Pat. No. 3,559,406, incorporated herein by reference, I disclosed how concentric pistons could be utilized within a servomotor to develop an increased output when the desired braking force exceeds that which can be generated by the pressure differential acting across a wall in the servomotor. The concentric pistons are simultaneously moved by the pressure differential created within the servomotor until vacuum runout occurs after which one of the pistons moves independently of the other in response to a manual input to supply the master cylinder with an additional operational force. However, the additional operational force will act on both the first and second concentric pistons to reduce the effect of the manual input by changing the volume of the pressure chamber within the master cylinder.

SUMMARY OF THE INVENTION

I have devised a hydraulic locking means for use with a pressure ratio changer means in a servomotor through which a master cylinder of a braking system is supplied with an operational input. The hydraulic locking means has a valve means located within a passage leading to a chamber within the master cylinder. During simultaneous movement of a first piston attached to the movable wall of the servomotor and a second piston connected to an input push rod, hydraulic fluid will freely flow into the chamber past the valve means. Upon reaching vacuum runout, the second piston moves independently in response to an input force to permit a resilient means to close the passage by actuating the valve means to trap hydraulic fluid within the chamber. The trapped hydraulic fluid will hold the first piston in a stationary position to permit substantially all of the input force from the operator to be converted into an operational output force for the braking system.

It is therefore the object of this invention to provide a pressure ratio changer with a locking means for preventing any input force from being dissipated within the ratio changer upon actuation of the locking means.

It is another object of this invention to provide a servomotor with an output means having a first piston attached to a wall movable by a pressure differential acting thereacross and a concentric second piston connected to receive an input force from an operator with a locking means to prevent further movement of the first piston which would affect the increased output force that can be generated by subsequent independent movement of the second piston.

BRIEF DESCRIPTION OF THE DRAWINGS

FIG. 1 is a sectional view of a power braking system having a servomotor with a hydraulic lock connected to a pressure ratio changer for supplying master cylinders with an operational force in response to an input from an operator.

FIG. 2 is a sectional view of another embodiment of a hydraulic locking device for use with the pressure ratio changer of FIG. 1; and FIG. 3 is a graph showing brake line pressure as a function of pedal effort by the operator.

DETAILED DESCRIPTION OF THE PREFERRED EMBODIMENT

The braking system 10 shown in FIG. 1 has a fluid pressure servomotor 12 connected to a master cylinder 14 for supplying the front wheel brakes 16 and the rear wheel brakes 18 with an operational hydraulic force in response to an input force applied to pedal 20 by an operator.

The fluid pressure servomotor 12 has a first shell 22 joined to a rear shell 24 by a bayonet type twist lock arrangement. A movable wall means 28 is located within the shell 22 and 24 to form a first variable volume chamber 30 and a second variable volume chamber 32. The wall means 28 has a central hub 34 to which a diaphragm 36 is attached. A support plate 38 has a series of fingers 40 which fasten the diaphragm against the hub to create an inner seal between the first chamber 30 and the second chamber 32 while bead 42 is held between flanges 44 and 46 to develop an outer seal.

The hub 34 has a rearwardly extending projection 48 which is carried by a bearing seal 50 in an axial opening 52 in the rear shell 24. The projection 48 has an axial bore 54 for retaining a pressure ratio changer means 56. The pressure ratio changer means 56 has a first piston 58 and a concentric second piston 60. The second piston 60 has a blind axial bore 62 into which a reaction means 64 is located. The reaction means 64 is retained in bore 62 by a sleeve 66 which is slidably fitted into bore 62. The sleeve 66 has a bearing surface 68 on which plunger 70 is moved by push rod 72. The sleeve 66 has an opening which is aligned with a slot 76 in the second piston 60 into which a pin 78 is inserted for retaining the plunger 70 in a fixed position.

The rear of the plunger 70 engages a control valve means 71 for controlling the communication of vacuum available in the first chamber 30 through a first passage 74 into the bore 54 and out a second passage 77 into the second chamber 32 to permit return spring 79 to hold the wall means 28 against shell 24. The control valve means 71 has a vacuum poppet 82 with a flexible section 84 having a bead 86 attached to the rearward section 48 of the hub by retainer 88 and an atmospheric poppet 90 which is positioned within bore 54 by a plurality of projections 92 on flange 94. A first spring 96 is secured to the retainer 88 for urging the vacuum poppet 82 toward a vacuum seat 98; a second spring 100 urges the atmospheric poppet 90 toward the atmospheric seat 102 on the plunger 70; and a third spring 104 located between the retainer 88 and push rod 72 urges the plunger 70 and atmospheric poppet 90 toward the vacuum poppet 82 to provide uninterrupted communication between the first passage and the second passage in the rest position, as shown in FIG. 1.

The first piston 58 of the pressure ratio changer has a flange 105 on the end thereof which fills bore 106 of the master cylinder 14. The flange 105 has a groove 108 on the periphery thereof into which a seal 110 is positioned to prevent the passage of fluid from the first pressurizing chamber 112 to the locking chamber 114. A seal 116 permits the first piston 58 to move into the first pressurizing chamber without fluid being communicated into the first chamber 30

A valve means 118 is located within a passage 120 which connects the pressurizing chamber 112 with the locking chamber 114. The valve means 118 has a stem 122 which engages an actuator surface 124 on the second piston to hold spherical face 126 away from seat 128. A resilient means or spring 130 located within passage 120 urges the face 126 toward the seat 128.

A first valve spring 132 surrounds the second piston 60 to engage and hold sleeve 134 against snap ring 136. A tilt valve means 172 has a stem 174 which extends from a face 176 into engagement with sleeve 134. A spring 178 urges face 176 toward a seat 182 on the housing surrounding opening 180 into reservoir 184. An actuation spring 138 surrounds a projection 140 on the second piston 60 to position a third piston 142 within the master cylinder 14 in opposition to return spring 144 located within the second pressurizing chamber 146. The third piston 142 has a first flange 148, a second flange 150 and a third flange 152. The first flange 148 engages a stem 154 on the end of a face 156 of a tilt means 158. The second flange 150 carries a seal 160 which prevents fluid from the pressurizing chamber 146 from entering a neutral chamber 162 connected to the reservoir 164 by passage 166. The third flange 152 has a seal 168 which prevents communication between the pressurizing chamber 112 and the neutral chamber 162. The distance between the second and third flanges is greater than the stroke between the first flange 148 and the bottom of the master cylinder 170 to assure that comingling between the first pressurizing chamber 112 and the second pressurizing chamber 146 does not occur.

MODE OF OPERATION OF THE PREFERRED EMBODIMENT

When an initial operator input force is applied to brake pedal 20, push rod 72 will move plunger 70 to permit spring 96 to seat the vacuum poppet 82 on seat 98 and interrupt the communication of vacuum from the first chamber 30 through passage 74. With further movement, the atmospheric seat 102 will move away from the atmospheric poppet 90 which will be urged against shoulder 186 by spring 100 to permit air to enter the second chamber 32 by flowing from bore 54 through the second passage 76. With air in chamber 32 and vacuum in chamber 30, a pressure differential will be created across wall means 28. This pressure differential will act on plate 38 to transmit an output force from the hub means 34 which will move the first piston 58 in the pressurizing chamber 112. Sleeve 66 will contact the end of the second piston 60 to provide simultaneous movement thereto with the first piston 58, to interrupt communications between the reservoir 184 and the first chamber 112. As the first and second pistons 58 and 60 move, hydraulic pressure will develop in the pressurizing chambers 112 and 146 since initial movement of the second piston 60 will permit spring 132 to correspondingly move sleeve 134 and allow spring 178 to seat face 176 over opening 180. This hydraulic fluid pressure build up is communicated through passage 120 into the locking chamber 114. The output from the first and second pistons will follow a line 188 until the entire second chamber 32 in the servomotor 12 contains air at atmospheric pressure, point 190 in FIG. 3, at which time the input force from the pedal 20 is transmitted through plunger 70 and sleeve 66 into the second piston 60. This input force causes the second piston 60 to independently move and permit spring 130 to close passage 120 by urging face 126 on seat 128. As the second piston 60 moves further into the pressurizing chamber 112, the hydraulic fluid build-up is transmitted to operate the wheel brakes 16 and 18 with a hydraulic pressure as shown by line 192, without any loss caused by piston 58 moving to expand the chamber 112.

Upon termination of the input force on the brake pedal, spring 144 and 138 will urge the actuator face 124 into contact with stem 118 to permit the hydraulic fluid in the locking chamber 114 to freely flow into the pressurizing chamber 112. At the same time return spring 79 will move the wall means 28 toward shell 24. Since spring 104 has seated the atmospheric poppet 90 between the atmospheric seat 102 and the vacuum poppet 82, vacuum available through check valve 194 connected to the intake manifold will evacuate the air from the second chamber 32.

In the event that vacuum is unavailable at the intake manifold an input force applied to brake pedal 20 will initially move the second piston 60 within the first piston 58 to permit immediate closure of passage 120 by valve means 118. Thus, the entire wall means 28 and hub means 34 will not need to be carried to produce an output force capable of operating the master cylinder 14. The output from the second piston will follow a line 196 shown in FIG. 3 which shows that a higher output can be produced than is possible where both pistons are moved, see line 195, during a no power condition.

In the embodiment shown in FIG. 2, the tilt valve 204 in the opening between the reservoir 184 and the bore 106 of the master cylinder has been moved to permit an actuator 200 on the first piston 58 to close communication between the reservoir 184 and the pressurizing chamber 112. A second tilt valve 206 located in passage 208 of the cylindrical portion of the first piston 58 is actuated by the movement of shoulder 210 as the second piston 60 moves individually to close communication between chamber 112 and the locking chamber 114.

In normal operation, hydraulic fluid pressure can pass through slot 212 into chamber 214 and through passage 208 as the first piston 58 and the second piston 60 move together. Upon closing of the tilt valve 204 by spring 216 the pressure in chamber 112 will begin to build up. When vacuum runout is reached, point 190 in FIG. 3, the second piston 60 will be moved individually by push rod 72 to close passage 208 by spring 218 holding face 220 against the cylindrical housing to prevent hydraulic fluid from entering the locking chamber 114. Upon release of the input force the tilt valves 204 and 206 are opened to permit communication between the reservoir and the bore 106.

I claim:

1. In a power braking system having a servomotor through which a first operational force is supplied to a brake energizer from the simultaneous movement of a plurality of concentric pistons in response to an input force, means for permitting one of said pistons to supply an additive operational force to said brake energizer when one of the pistons moves independently of the other pistons, said means comprising:
   chamber means connected by a passage to receive an output signal from said brake energizer;
   valve means located in said passage for controlling the communication of said output signal to said chamber means; and
   actuator means connected to said one of said pistons and said valve means to prevent said output signal from being communicated to said chamber means upon independent movement of said one piston, said valve means retaining said output signal within said chamber means to hold the remaining pistons stationary in said bore while said input force is transmitted through said one of said pistons to establish an increased output signal.

2. In the power braking system, as recited in claim 1, wherein said valve means includes:
   stem means located in said passage and connected to said actuator means; and
   resilient means located in said passage for urging said stem means toward a seat to prevent said operational signal from being communicated through said passage upon said independent movement of said one piston.

3. In the power braking system, as recited in claim 2, wherein said actuator means includes:
   an annular projection attached to said one piston for engaging said stem means during said simultaneous movement of the plurality of pistons permit said output signal to be freely communicated into to said chamber means.

4. In the power braking system, as recited in claim 3, wherein said chamber means includes:
   seal means associated with said remaining pistons for limiting the communication path for the increased output signal to said passage.

5. In the power braking system, as recited in claim 1, wherein said valve means includes:
   first stem means located in said passage and connected to said actuator means, said first stem means having a first face on one end thereof; and
   first resilient means being connected to said first stem means for urging said first face toward a first seat to prevent said output signal from being communicated to said chamber means upon independent movement of said one piston.

6. In the power braking system, as recited in claim 5, wherein said valve means further includes:
   second stem means located in said chamber means and a reservoir, said second stem means having a second face on the end thereof; and
   second resilient means being connected to said second stem means for urging said second face toward a second seat upon movement of said one piston to retain said increased output signal in said chamber means.

7. In a vehicle braking system having a servomotor with a pressure ratio changer which includes a first piston connected to a movable wall and a second piston slidably carried by the first piston and responsive to an input force from an operator to actuate a control for developing a first output force upon movement of the wall to supply the braking system with a first operational fluid force, locking means for permitting said first and second pistons to move simultaneously with the wall until a desired operational force exceeds the first output force and for allowing the second piston to move independently of the first piston and supply a second output force to develop an additive change in magnitude of said first operational fluid force, said locking means comprising:
   a housing having a bore therein connected to a reservoir and said braking system, said first and second pistons being located within said bore to form a pressurizing chamber therein, said first piston forming a locking chamber with the housing, said locking chamber being connected to said bore by a passage within said first piston;
   valve means connected to said passage for controlling the communication of said first operational fluid force to said locking chamber; and
   actuator means associated with said second piston and said valve means to prevent the additive change in operational fluid force from being communicated to said locking chamber upon independent movement of the second piston, said valve means retaining said first operational fluid force in the locking chamber to hold said first piston in a stationary position in said bore during said independent movement of the second piston.

8. In the vehicle braking system, as recited in claim 7, wherein said valve means includes:
   first stem means located in said passage and connected to said actuator, said stem means having a face thereon; and
   first resilient means being connected to said first stem means for urging said face toward a seat to simultaneously close said passage upon independent movement of the second piston.

9. In the vehicle braking system, as recited in claim 8, wherein said valve means includes:
   second stem means located in an opening between said reservoir and the bore, said second stem means being connected to said actuator means, said second stem means having a face thereon; and
   second resilient means being connected to said second stem means for urging the face thereon toward a seat in the housing to interrupt communication between the reservoir and the bore and permit said operational fluid force to be developed within said bore upon independent movement of the second piston.

10. In the vehicle braking system, as recited in claim 8, wherein said valve means includes:
   second stem means located in an opening between said reservoir and the locking chamber, said second stem means having a face thereon, said second stem means being connected to said first piston; and
   second resilient means being connected to said second stem means for urging the face thereon toward a seat in the housing to prevent communication therebetween during the development of the operational fluid force.

* * * * *